(12) United States Patent
Yoshino et al.

(10) Patent No.: US 8,702,549 B2
(45) Date of Patent: Apr. 22, 2014

(54) VEHICLE DRIVE UNIT

(71) Applicant: Honda Motor Co., Ltd., Tokyo (JP)

(72) Inventors: Tsutomu Yoshino, Wako (JP); Hisashi Murakami, Wako (JP); Satoshi Nakamura, Wako (JP); Koji Aoki, Wako (JP); Naoki Kamimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/847,592

(22) Filed: Mar. 20, 2013

(65) Prior Publication Data

US 2013/0288841 A1    Oct. 31, 2013

(30) Foreign Application Priority Data

Mar. 30, 2012    (JP) ................. 2012-080240

(51) Int. Cl.
*F16H 48/06*    (2006.01)
*F16H 57/08*    (2006.01)

(52) U.S. Cl.
USPC .......................... 475/149; 475/331

(58) Field of Classification Search
CPC ........... H02K 7/116; F16H 1/28; F16H 57/08; F16H 2001/28; F16H 2057/02065; F16H 2057/08; B60K 7/0007

USPC .................................... 475/149, 331
See application file for complete search history.

(56) References Cited

U.S. PATENT DOCUMENTS

| 6,641,500 | B2 * | 11/2003 | Shoge .......................... 475/276 |
| 2005/0211481 | A1 * | 9/2005 | Sasamoto ..................... 180/65.2 |
| 2011/0251008 | A1 * | 10/2011 | Schmitz et al. ................. 475/31 |

FOREIGN PATENT DOCUMENTS

JP    2005-335535    12/2005

\* cited by examiner

*Primary Examiner* — Edwin A Young
(74) *Attorney, Agent, or Firm* — Squire Sanders (US) LLP

(57) ABSTRACT

A vehicle drive unit includes an axle formed of an output shaft of a motor, and a first support shaft and a second support shaft arranged at both ends of the output shaft. A stator is held on a first holding plate and a second holding plate. The second holding plate and a bearing block form a carrier of planetary gears. The second holding plate includes a bearing holding portion. The second support shaft is supported on the bearing holding portion. The first support shaft is supported on the first holding plate. The output shaft is supported at one end on the first holding plate and the other end on the bearing holding portion.

16 Claims, 9 Drawing Sheets

VEHICLE DRIVE UNIT

BACKGROUND

1. Field

The present invention relates to a vehicle drive unit and relates particularly to a vehicle drive unit having an electric motor and reduction gearing installed inside a wheel hub of a vehicle.

2. Description of Related Art

Patent Document 1 (Japanese Patent Application Publication No. 2005-335535) discloses a hub unit for an electrically movable wheel having an electric motor and reduction gearing arranged inside a wheel hub of an electric vehicle as a drive unit of the vehicle. This hub unit includes a left-right split type shaft formed of a rotating shaft which is a motor output shaft and left and right fixing support shafts provided at both ends of the rotating shaft. The left fixing support shaft is fixed to a holding plate (first end plate) rotationally supporting the wheel. The right fixing support shaft is supported on a boss formed on a support frame for planetary gears forming the reduction gearing. The shaft of each planetary gear included in the reduction gearing disposed inside a right part of the hub unit is supported on a carrier (second end plate) of the planetary gear and the support frame.

In the hub unit for an electrically movable wheel described in Patent Document 1, the right fixing support shaft is supported by means of only the support frame fixed to the carrier. Thus, the right fixing support shaft is supported based on the strength of the support shaft. The support structure for the fixing support shaft is desirably capable of supporting it more firmly because the weight of the vehicle and the rider during travel is exerted as a load on the fixing support shaft. The strength may be improved by increasing the size of the support frame. However, it has a problem that there is a limitation in increasing the size of the lid member disposed in the wheel hub which is a limited space. Moreover, centering the split axles is difficult because multiple extension parts supporting the axles lie therebetween.

SUMMARY

To solve the above-mentioned problems, an object of the present invention is to provide a vehicle drive unit which has a shaft structure of a left-right split design formed of a rotating shaft and left and right fixing support shafts and which is suitable for improving the strength to support the fixing support shafts and improving the assemblability thereof.

For the purpose of achieving the above object, a first embodiment of the present invention is a vehicle drive unit including an electric motor provided in a vehicle wheel hub. The electric motor has an output shaft. An axle formed of a first support shaft and a second support shaft is disposed at both ends of the output shaft. Reduction gearing is provided, and includes a reduction gear coupled to the output shaft. The electric motor is formed of a cylindrical stator held on both sides by a pair of a first holding plate and a second holding plate, and a rotor including the output shaft which rotates relative to the stator about an axis of the axle. The reduction gear of the reduction gearing is supported on the second holding plate and a bearing block joined to the second holding plate. The second holding plate includes a bearing holding portion provided in such a way as to project toward the second support shaft and to cover an outer periphery of a portion of the output shaft adjacent to the second support shaft. The first support shaft is supported on the first holding plate, and the second support shaft is supported on the bearing holding portion.

A second embodiment of the present invention is such that one end of the output shaft of the electric motor is supported on the first holding plate, while the other end of the output shaft is supported on the bearing holding portion.

Moreover, a third embodiment of the present invention is such that the reduction gear is a planetary gear meshing with a sun gear provided on the output shaft. A cut is formed in an outer peripheral wall forming the bearing holding portion; the cut penetrates the outer peripheral wall so as to allow the planetary gear to be situated partially within the bearing holding portion and to mesh with the sun gear.

A fourth embodiment of the present invention is such that a thickness of a wall portion of the bearing holding portion in which the cut is formed is larger than thickness of the bearing block.

A fifth embodiment of the present invention is such that an outer peripheral surface of a tip portion of the bearing holding portion is in contact with an inner peripheral surface of an opening portion of a bearing-holding-portion insertion hole formed in the bearing block.

A sixth embodiment of the present invention is such that two of the planetary gears are provided such that the planetary gears are symmetrical about the output shaft of the electric motor.

A seventh embodiment of the present invention is such that the cut is formed at two locations corresponding to the two planetary gears at which the cuts are arranged along a front-rear direction of a body of a vehicle to be equipped with a wheel including the wheel hub.

An eighth embodiment of the present invention is such that the bearing holding portion is tubular, and the second holding plate including the bearing holding portion and the bearing block are molded integrally with each other.

According to embodiments of the present invention, the stator is held on both sides. Thus, the first and second support shafts forming the split-type axle can be held on the first and second holding plates whose rigidity is increased as a result of adding the rigidity of the stator. Accordingly, a rigid vehicle drive unit capable of withstanding a larger load can be provided inside the wheel. Moreover, since the axle is supported on the pair of holding plates, the number of components can be reduced, and the centering can be done easily as well.

According to other embodiments of the present invention, the pair of holding plates which are rigid members can support the output shaft in such a way as to support the inter-shaft gaps. Accordingly, the centering of the axle and the output shaft can be done easily.

According to other embodiments of the present invention, the reduction gear and the output shaft of the electric motor situated within the tubular bearing holding portion can be connected.

According to other embodiments of the present invention, the rigidity of the tubular bearing holding portion itself can be improved. Accordingly, sufficient rigidity can be secured even if the cut is formed.

According to other embodiments of the present invention, the bearing block is in contact with the outer peripheral surface of the tubular bearing holding portion. Thus, loads inputted to the axle can be received by the second holding plate through the bearing block. Accordingly, the bearing block is supported by the tubular bearing holding portion.

According to other embodiments of the present invention, two planetary gears are provided. Accordingly, the number of components forming the reduction gearing can be reduced.

Moreover, the two planetary gears are disposed in such a way as to be located symmetrically about the output shaft of the electric motor. Accordingly, the intensity of the transmissions to the gears can be made uniform.

According to other embodiments of the present invention, the cuts are arranged along the front-rear direction of the vehicle body in accordance with the two planetary gears. Thus, the portions excluding the cuts are located at upper and lower sides. In this way, vertical loads exerted on the axle can avoid the cuts. Accordingly, it is possible to secure high rigidity against vertical loads.

According to other embodiments of the present invention, the second holding plate including the bearing holding portion and the bearing block are molded integrally with each other. Accordingly, the rigidity can be increased further.

DETAILED DESCRIPTION

Figure 1:
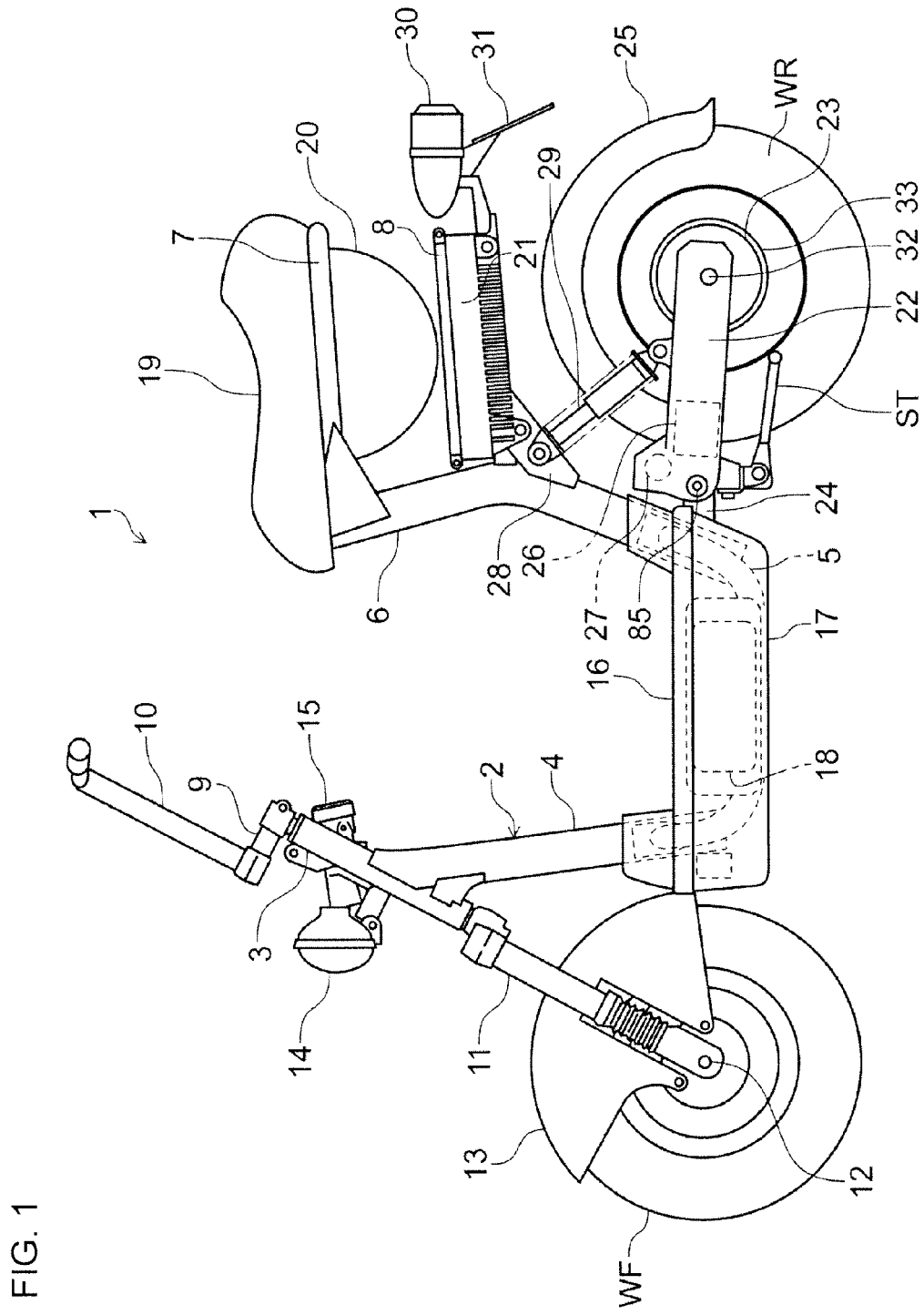
FIG. 1 is a left-side view of an electric vehicle according to embodiments of the present invention.

Hereinbelow, embodiments of the present invention will be described in detail with reference to the drawings. FIG. 1 is a left-side view of an electric vehicle including a power unit as an electric-vehicle drive unit according to an embodiment of the present invention. A main frame 2 of an electric vehicle 1 is formed of a head pipe 3, a down pipe 4 extending downward from the head pipe 3, a pair of left and right lower pipes 5 joined at the front end to the down pipe 4 and extending horizontally rearward, a seat post 6 connected to the rear end of each lower pipe 5 and extending upward, a seat frame 7 extending horizontally rearward from the upper end of the seat post 6, and a middle frame 8 situated below the seat frame 7 and extending horizontally rearward from the seat post 6.

A steering handlebar 10 is coupled through an arm to the upper end of a steering shaft (not shown) vertically penetrating the inside of the head pipe 3. A pair of left and right front forks 11 is coupled to the lower end of the steering shaft and extends downward. A front wheel WF is rotatably supported on a front axle 12 provided at the lower end of each front fork 11. A front fender 13 for covering the front wheel WF from above is attached to the front forks 11. A headlight 14 is provided in front of the head pipe 3, and a gauge 15 is provided behind the head pipe 3.

A step floor 16 is provided to the lower pipes 5. A space whose upper portion is covered with the step floor houses a battery 18. The battery 18 is formed of multiple columnar battery cells wrapped with a resin shrink pack (heat shrinkable pack). A lower portion of the step floor 16 is covered with an under cover 17.

A seat 19 is disposed on top of the seat frame 7. A storage box 20 capable of housing a helmet or the like is provided under the seat frame 7. The seat 19 is openable and closable so that it can be utilized as a lid of the storage box 20.

A charging/voltage-converting device 21 is disposed on the middle frame 8. The charging/voltage-converting device 21 is formed of a charger configured to charge the battery 18 by converting commercial power into DC power and lowering it to a predetermined voltage, and a DC-DC converter configured to convert battery voltage, which is set to high voltage for use in driving an electric motor of the motorcycle 1, into constant voltage suitable for electric parts other than the electric motor (such as the headlight and a taillight).

A bracket 24 is joined to a rear portion of each lower pipe 5. A swingarm 22 is coupled to the bracket 24 vertically swingably through a pivot shaft 85. A power unit 23 formed of the electric motor and a reduction gear device is supported on an axle 32 at a rear portion of the swingarm 22. The power unit 23 is housed in a wheel hub (hereinafter, simply referred to as "hub") 33 of a rear wheel WR which is a vehicle-side rotation member.

An electric power control unit 26 configured to control the power unit 23 and a smoothing capacitor 27 accompanying the electric power control unit 26 are attached to the swingarm 22. The electric power control unit 26 also includes a charge control circuit configured to allow the battery 18 to be charged with regenerative energy provided by the electric motor. A side stand ST is attachable to a lower portion of the bracket 24.

A rear cushion 29 is laid between the swingarm 22 and a bracket 28 coupling the middle frame 8 and the seat post 6. A tail light unit 30 is provided to a rear portion of the middle frame 8. A license plate 31 is provided below the tail light unit 30. A rear fender 25 is provided above the rear wheel WR.

Figure 2:
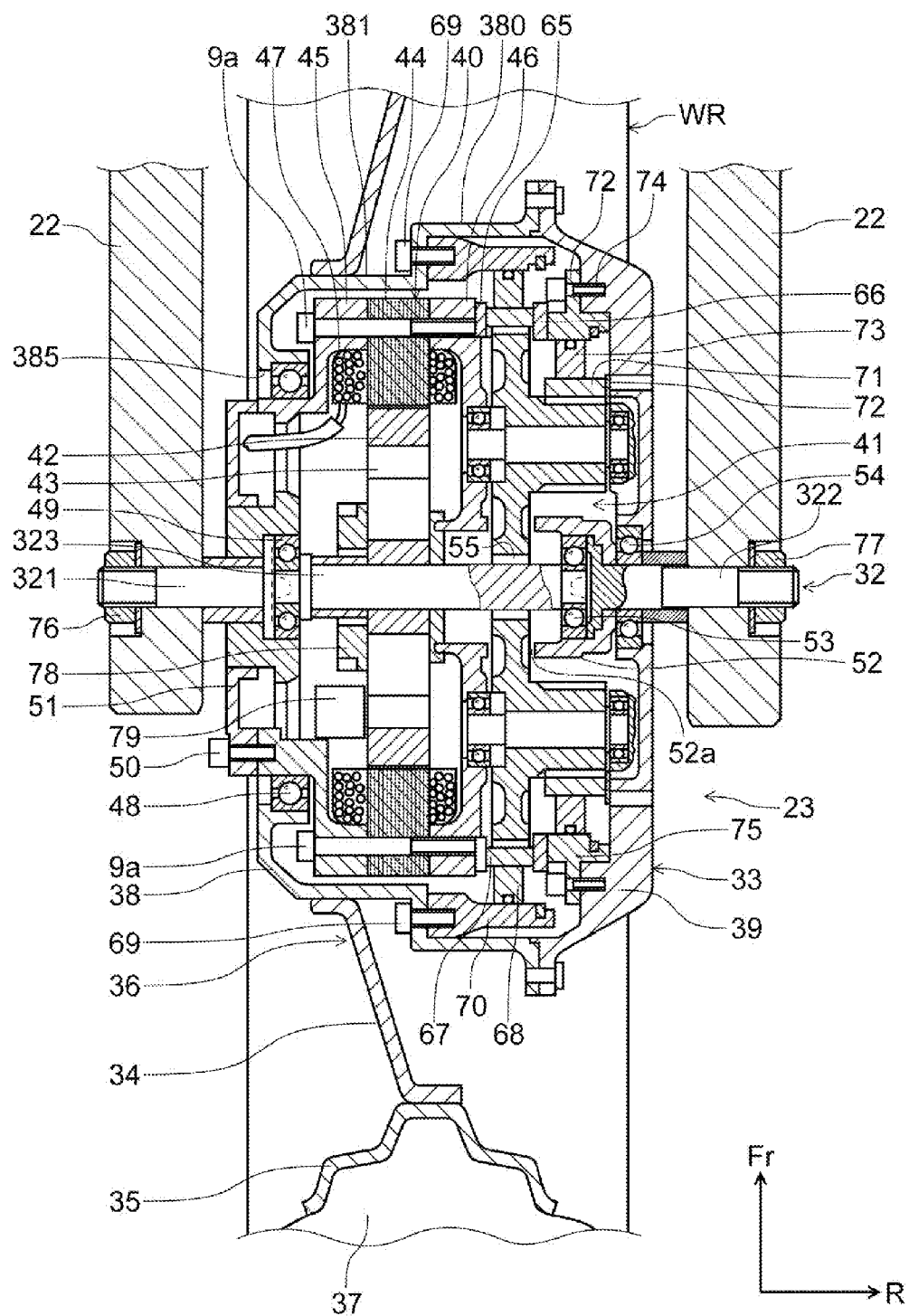
FIG. 2 is a cross-sectional view taken along a plane extending along a swingarm through an axle of a rear wheel including a power unit and seen from above.
Figure 3:
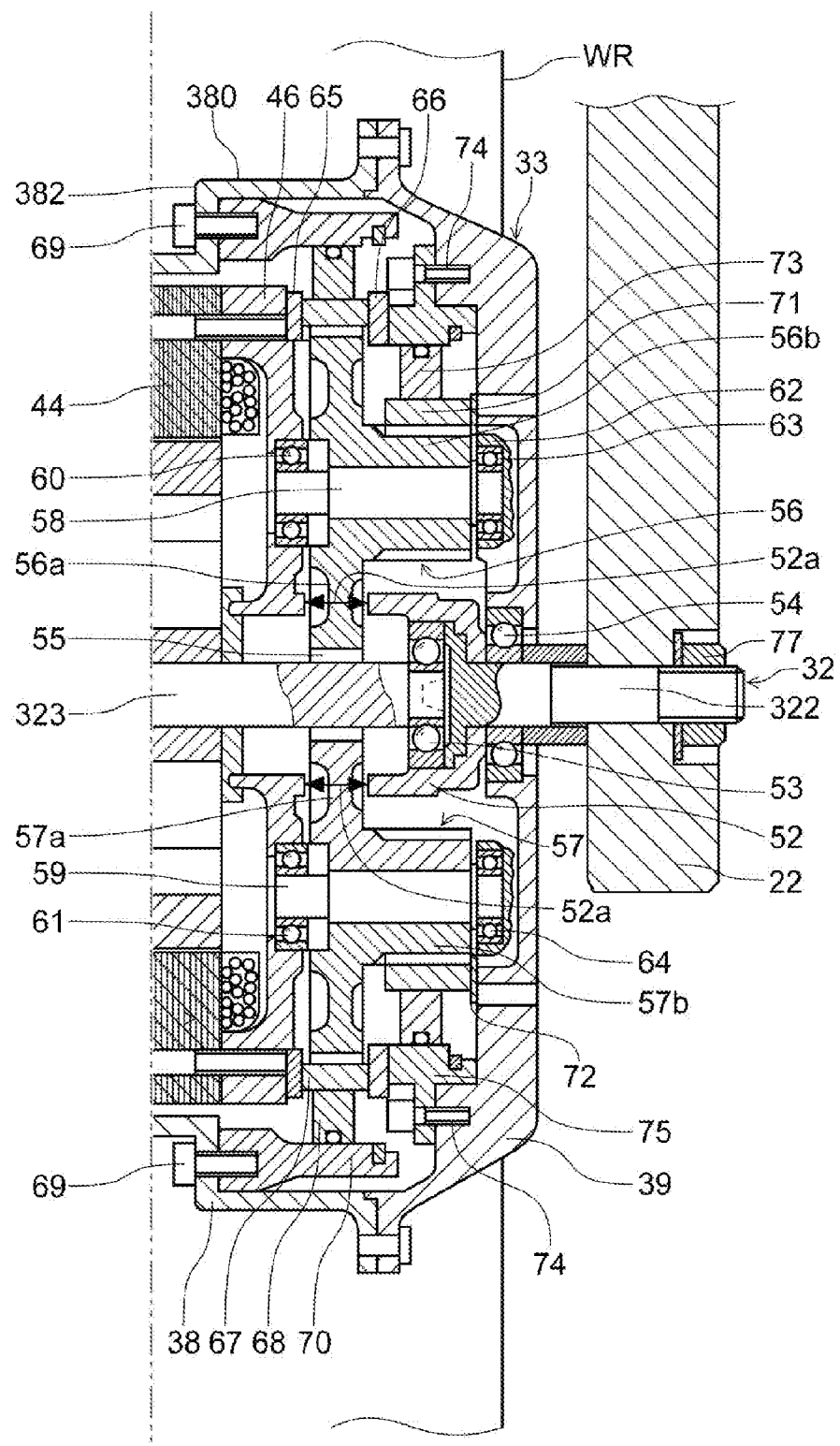
FIG. 3 is an enlarged view of a right part of FIG. 2.
Figure 4:
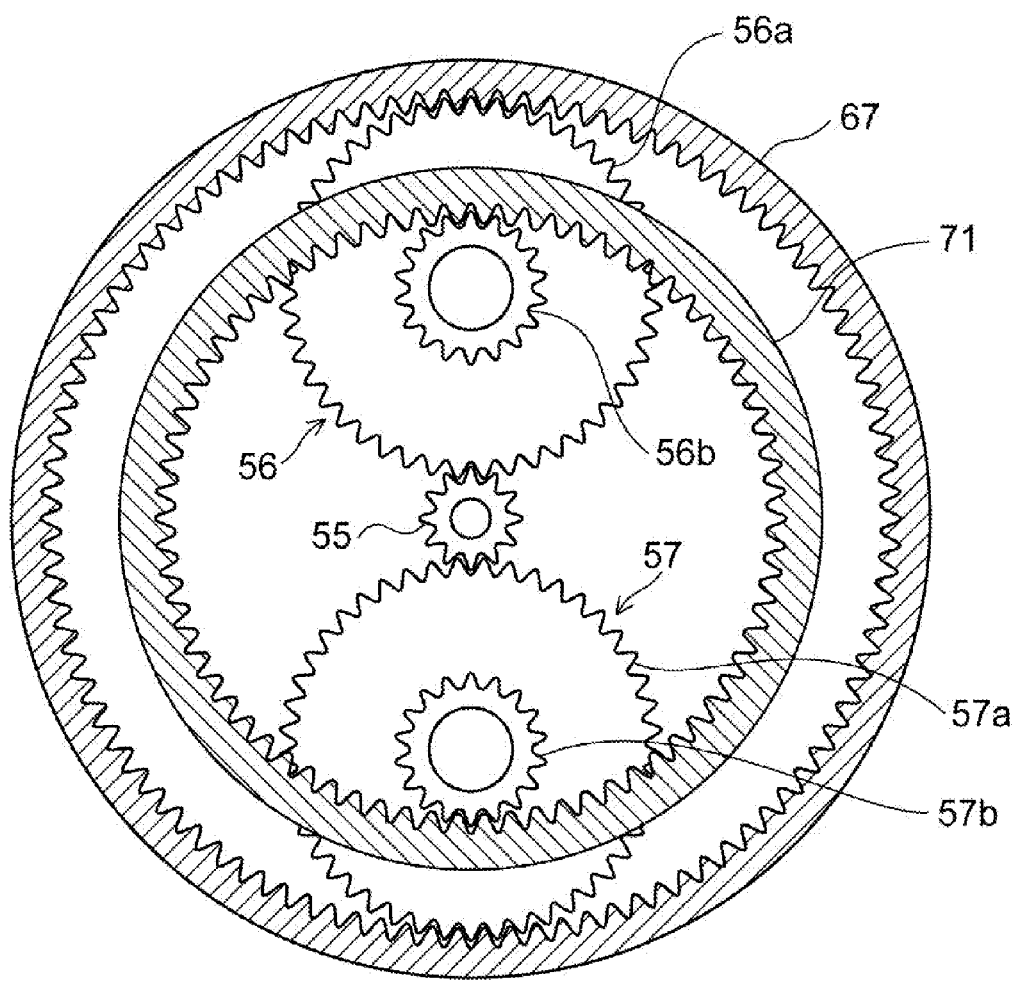
FIG. 4 is a view showing the gear arrangement of a reduction gear device seen from the right side in FIG. 2.
Figure 5:
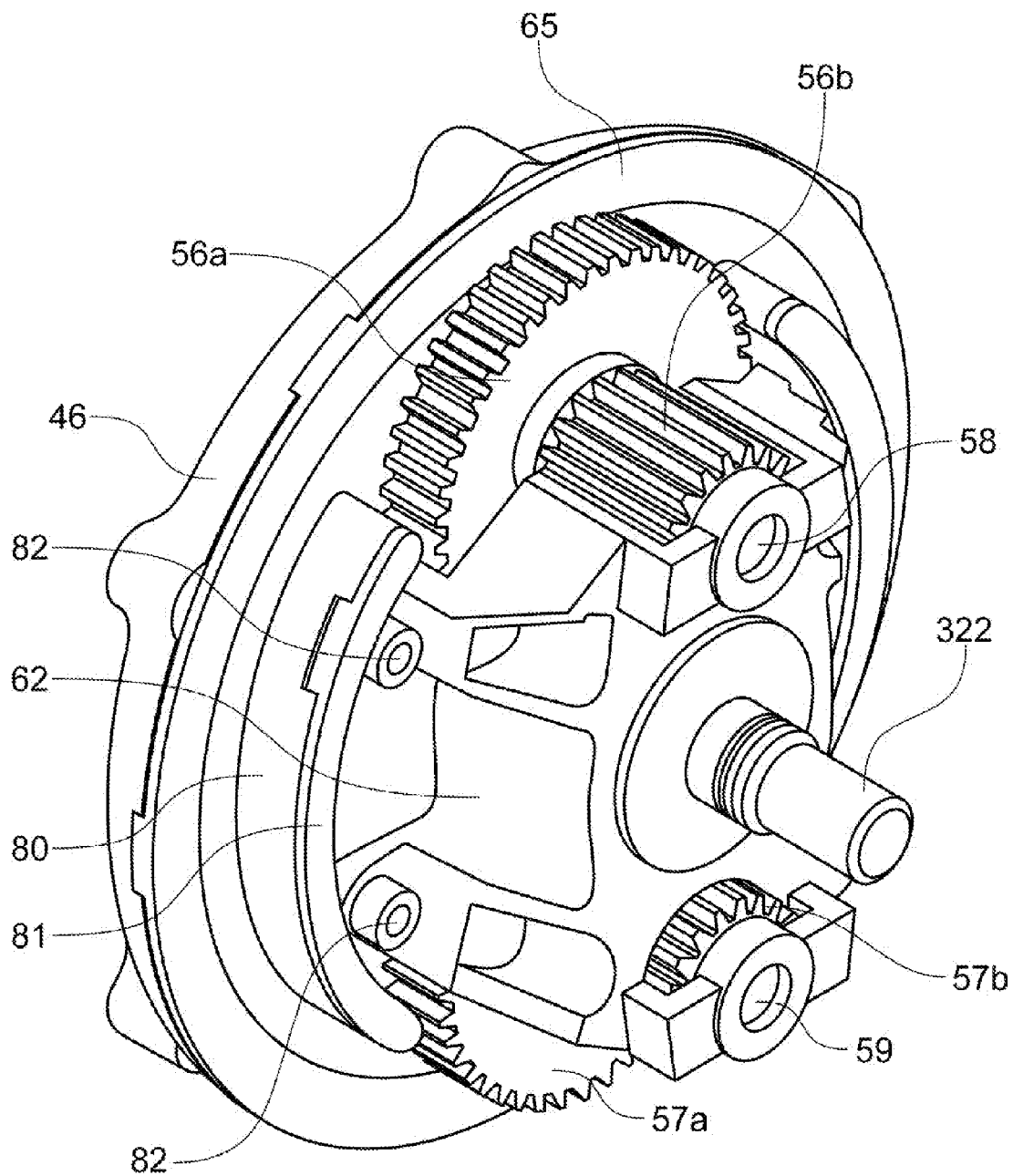
FIG. 5 is a perspective view showing a planetary gear device included in the reduction gear device and a bearing block for the planetary gear device.
Figure 6:
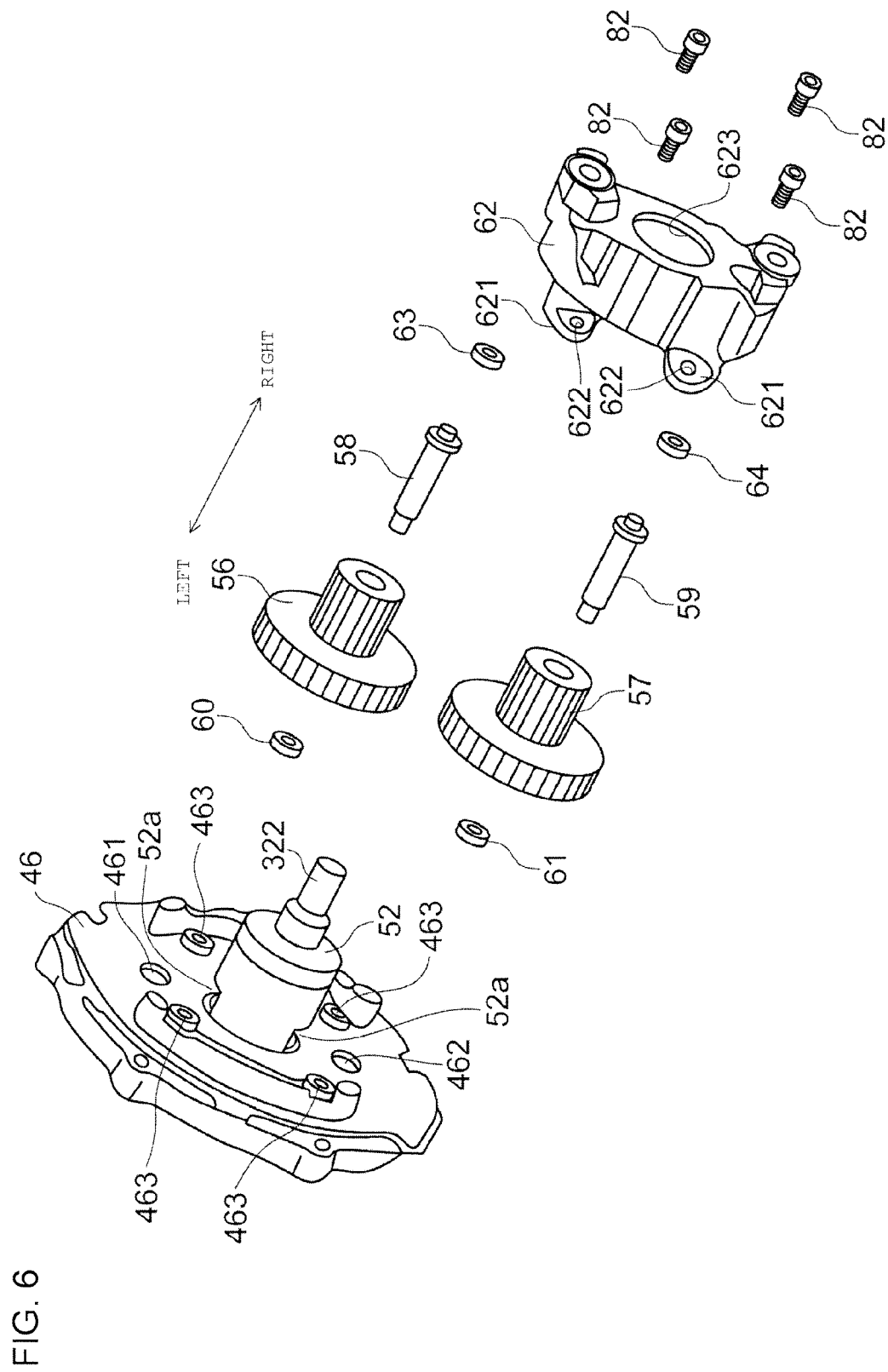
FIG. 6 is an exploded perspective view of the planetary gear device.

FIG. 2 is a cross-sectional view of the rear wheel WR including the power unit 23 and is a view taken along a plane extending along the swingarm through the axle 32 of the rear wheel and seen from above. FIG. 3 is a view of a right part of FIG. 2 enlarged to secure a space to show reference numerals. Thus, in FIG. 2, reference numerals are given only to main portions. FIG. 4 is a view showing the gear arrangement of the reduction gear device seen from the right side in FIG. 2. FIG. 5 is a perspective view showing a planetary gear device included in the reduction gear device and a bearing block for the planetary gear device. FIG. 6 is an exploded perspective view of the planetary gear device.

In FIGS. 2 to 6, the rear wheel WR is supported on the swingarm 22 through the axle 32. The rear wheel WR is formed of a wheel 36 including a hub 33, a spoke 34, and a rim 35. A tire 37 is fitted to the outer periphery of the rim 35. The hub 33 is formed of a case 38 which is a first hub part forming a left half of the hub 33, and a cover 39 which is a second hub part forming a right half of the hub 33 combined to the case 38.

The hub 33 houses an electric motor 40 and reduction gearing 41 formed of a gear device coupled to an output shaft of the electric motor 40, i.e. the axle 32. The electric motor 40 is formed of an inner rotor or rotor 43 including permanent magnets 42 with their S and N poles arranged alternately in the circumferential direction. An outer stator or stator 44 is disposed on the outer periphery of the rotor 43, and a first holding plate 45 and a second holding plate 46 is disposed on the left and right sides of the stator 44, respectively. Three-phase windings 47 are wound around the stator 44 to form armatures.

The axle 32 is splittable into three parts, namely, a left axle portion 321, a right axle portion 322, and a central shaft, i.e. a motor output shaft (hereinafter, referred to as "sun-gear shaft") 323. The sun-gear shaft 323 is the output shaft of the electric motor 40 and is fitted in a central hole in the rotor 43. The stator 44 as well as the first holding plate 45 and the second holding plate 46 disposed on the left and right sides of the stator 44 are joined together by use of multiple bolts 9a penetrating them in the direction the axle 32 extends.

The holding plate 45 is formed of a large-diameter portion having the same outer diameter as the stator 44, and a small-diameter portion having a stepped portion from the outer peripheral surface of the large-diameter portion and formed on the left side of the vehicle body. A bearing 48 is fitted to the outer periphery of the small-diameter portion. An outer peripheral member or outer race of the bearing 48 is fitted to the inner peripheral surface of a left opening 385 in the case 38. A bearing 49 is fitted in the center of the small-diameter portion of the first holding plate 45. The bearing 49 supports a left end portion of the sun-gear shaft 323 of the electric motor 40. A cap 51 is fixed to the left surface of the first holding plate 45 with a bolt 50.

A bearing holding portion 52 housing a bearing 53 which supports a right end portion of the sun-gear shaft 323 and a left end portion of the right axle portion 322 is formed integrally with the second holding plate 46. A bearing block 62 housing bearings 63 and 64 which support the right side of shafts 58 and 59 of planetary gears 56 and 57, respectively, is joined to the second holding plate 46 by use of multiple bolts 82. The left end portion of the right axle portion 322 is fitted or press-fitted into the bearing holding portion 52. The cover 39 is rotatably supported on the right axle portion 322 through a bearing held on the axle portion 322. Further, the second holding plate 46 including the bearing holding portion 52, which is cylindrical, and the bearing block 62 may be molded integrally with each other. Higher rigidity can be achieved by molding the second holding plate 46 and the bearing block 62 integrally with each other.

A sun gear (the electric motor's output gear) 55 is formed on the sun-gear shaft 323 on the right side of the electric motor 40, which is a position adjacent to the bearing 53. Large-gear portions 56a and 57a of the two planetary gears 56 and 57 are in mesh with the sun gear 55. The two planetary gears 56 and 57 are disposed in such a way as to be located symmetrically about the output shaft of the electric motor 40, i.e. the sun-gear shaft 323.

The bearing holding portion 52, formed integrally with the second holding plate 46, includes a tubular peripheral wall having a space to house the bearing 53. Openings or cuts 52a are formed in the tubular peripheral wall so that the large-gear portions 56a and 57a of the planetary gears 56 and 57 can be situated within the bearing holding portion 52 and mesh with the sun gear 55. The cuts 52a are formed at two locations corresponding to the two planetary gears 56 and 57 at which the cuts 52a are arranged along the front-rear direction of the vehicle body. By arranging the cuts 52a along the front-rear direction of the vehicle body, the portions excluding the cuts 52a are located at upper and lower sides. In this way, vertical loads exerted on the axle avoid the cuts 52a. Thereby, it is possible to secure high rigidity against vertical loads. Moreover, by providing only two planetary gears 56 and 57, it is possible to transmit larger power, to reduce the number of components, and to minimize the cutout portions formed by the cuts 52a and thus maintain higher rigidity. By providing the two planetary gears 56 and 57, it is possible to reduce the number of components forming the reduction gearing 41. Moreover, by disposing the two planetary gears 56 and 57 in such a way that they are located symmetrically about the output shaft 323 of the electric motor, it is possible to make uniform the intensity of the transmissions to the planetary gears 56 and 57.

The planetary-gear shafts 58 and 59 supporting the planetary gears 56 and 57 are supported at one end (left end) on bearings 60 and 61 fitted in the second holding plate 46 and supported at the other end (right end) on bearings 63 and 64 fitted in the bearing block 62, respectively. In other words, the planetary gears 56 and 57 use the second holding plate 46 fastened to the stator 44 and the bearing block 62 as a carrier.

A first internal gear 67 as a regeneration-side first-stage gear is provided whose axial position is restricted by annular guides 65 and 66. The first internal gear 67 meshes with both of the large-gear portions 56a and 57a of the planetary gears 56 and 57. A first one-way clutch 68 as a regeneration-side one-way clutch is fitted on the outer periphery of the first internal gear 67.

An annular first clutch plate (serving as a regeneration-side-internal-gear supporting member) 70 is fixed to the inner surface of the case 38 with bolts 69. The outer periphery of the first one-way clutch 68 faces the first clutch plate 70. The joining direction of the first one-way clutch 68 is set such that the first one-way clutch 68 is joined to the first clutch plate 70 when the first internal gear 67 attempts to rotate in a predetermined one direction whereas the first one-way clutch 68 slides on the first clutch plate 70 without being joined thereto when the first internal gear 67 rotates in the opposite direction from the predetermined one direction.

The case 38 is formed of a first cylindrical portion 380 capable of covering the outer periphery of the first clutch plate 70, and a second cylindrical portion 381 capable of covering the outer periphery of the stator 44 which is smaller in diameter than the first clutch plate 70. The first cylindrical portion 380 is larger in diameter than the second cylindrical portion 381. A connecting wall 382 connecting the first cylindrical portion 380 and the second cylindrical portion 381 extends in a direction perpendicular to the axle 32. The first clutch plate 70 is attached to the inner surface of this connecting wall 382, and the head of each bolt 69 is seated on the outer surface of the connecting wall 382.

A second internal gear 71 as a drive-side final-stage gear is provided in mesh with both of small-gear portions 56b and 57b of the planetary gears 56 and 57. The second internal gear 71 is smaller in diameter than the first internal gear 67, and its axial position is restricted by a guide 72 and guides 81. A second one-way clutch 73 as a drive-side one-way clutch is fitted to the outer periphery of the second internal gear 71.

An annular second clutch plate (drive-side-internal-gear supporting member) 75 is fixed to the inner surface of the cover 39 with bolts 74 inserted and fastened to the cover 39 from inside. The outer periphery of the second one-way clutch 73 faces the second clutch plate 75. The locking direction of the second one-way clutch 73 is set such that the second one-way clutch 73 is locked on the second clutch plate 75 when the second internal gear 71 attempts to rotate in a predetermined one direction whereas the second one-way clutch 73 slides on the second clutch plate 75 without being locked thereon when the second internal gear 71 rotates in the opposite direction from the predetermined one direction. The first one-way clutch 68 and second one-way clutch 73 are configured to be locked on their first internal gear 67 and second internal gear 71 in opposite rotational directions, respectively. In which directions the first one-way clutch 68 and second one-way clutch 73 come to be locked on their first clutch plate 70 and second clutch plate 75 will be described later.

The left and right swingarms 22 and 22 are fitted on the left axle portion 321 and the right axle portion 322, respectively. A male thread is formed on an end portion of each of the left axle portion 321 and the right axle portion 322. By screwing nuts 76 and 77 onto the male threads, the swingarms 22 and 22 are fastened to the left axle portion 321 and the right axle portion 322, respectively.

A rotational body 78 for detecting the position of the rotor 43 is joined to the left surface of the rotor 43. A position sensor, such as a Hall device, 79 is disposed near the rotational body 78.

In FIGS. 5 and 6, the annular guide 65 supporting one lateral surface of the first internal gear 67 is disposed on the right side of the outer periphery of the second holding plate 46 joined on the right side of the electric motor 40. Ribs 80 each of which has an arc shape as seen from the right and to which a guide is attached are provided on the right side of the second holding plate 46 at such positions as to cause no interference with the planetary gears 56 and 57. The guides 81 which sandwich and hold the second internal gear 71 from the left and right in cooperation with the guide 72 are attached to the ribs 80, respectively.

The bearing block 62 is a member with a cylindrical wall (leg portion) which covers a half of each of the planetary gears 56 and 57 on the sun-gear shaft 323 side and houses the bearings 63 and 64 (see FIG. 3) supporting right end portions of the planetary-gear shafts 58 and 59. The bearing block 62 also covers the bearing holding portion 52 as well as the sun-gear shaft (motor output shaft) 323 and the left end portion of the right portion 322 of the axle 32 which are supported on the bearing holding portion 52. The bearing block 62 is provided with: ribs 621 as attachments projecting outward at four locations on the side where the bearing block 62 contacts the second holding plate 46; and a circular bearing-holding-portion insertion hole 623 penetrating the center of the bearing block 62. A bolt insertion hole 622 is formed in each rib 621. The bearing block 62 is joined to the right surface of the second holding plate 46 by using a bolt 82 inserted in this bolt insertion hole 622.

Figure 7:
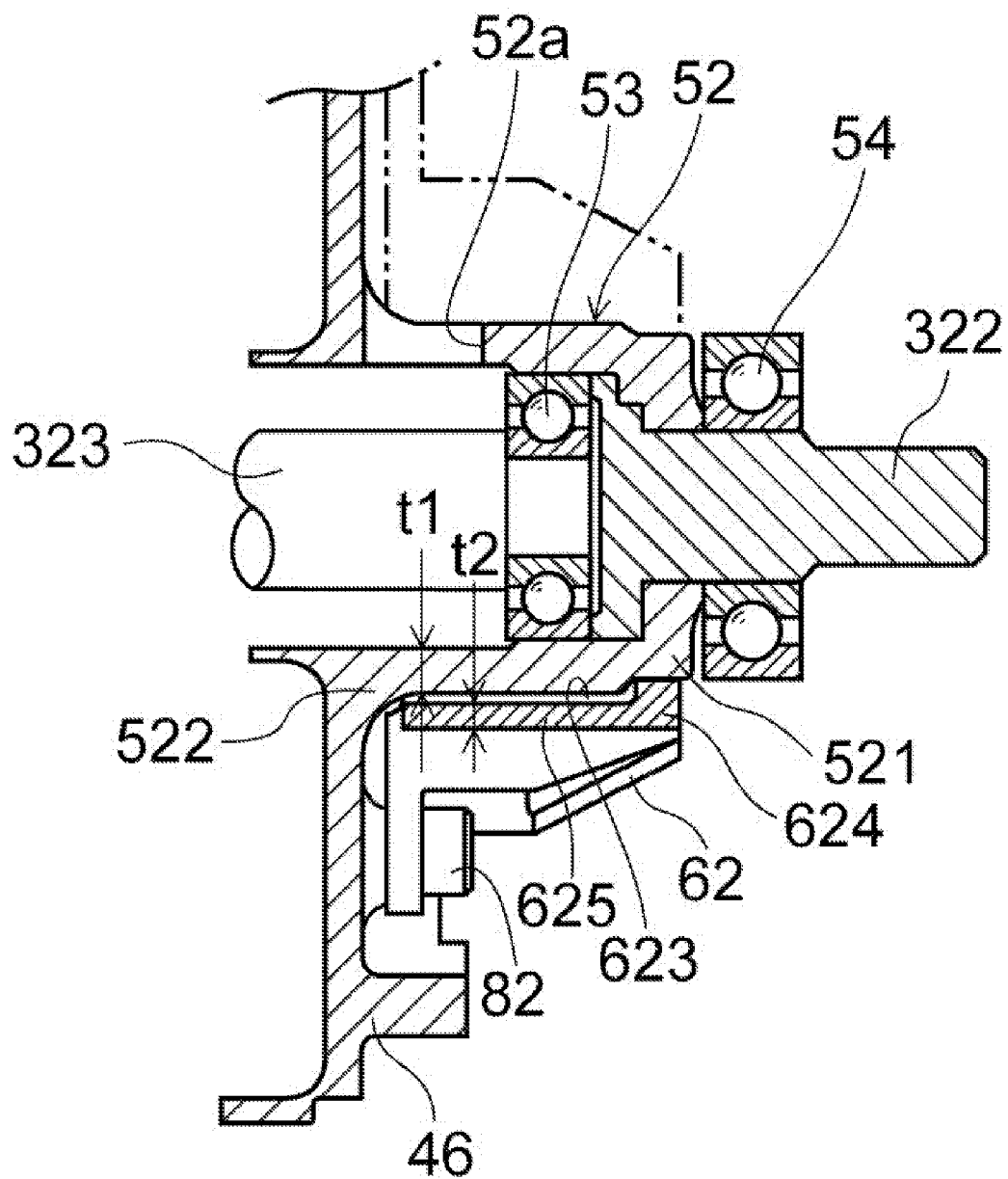
FIG. 7 is a cross-sectional view of a main part of the planetary gear device showing the relationship between a bearing holding portion and the bearing block.

The relationship between the bearing holding portion 52 and the bearing block 62 provided to the second holding plate 46 will be described further in detail. FIG. 7 is a cross-sectional view of a main part of the planetary gear device showing the relationship between the bearing holding portion and the bearing block. In FIG. 7, the bearing block 62 overlaps the cylindrical bearing holding portion 52. The inner peripheral surface of an end portion (right end portion in FIG. 7) 624 of the bearing block 62, i.e. the inner peripheral surface of an opening portion of the bearing-holding-portion insertion hole 623 is in contact with the outer peripheral surface of a tip portion (a right portion in FIG. 7) 521 of the bearing holding portion 52 out of the outer peripheral surface thereof. In this way, loads exerted on the sun-gear shaft 323 are supported by the bearing 54 through the bearing 53 and the right axle portion 322. Moreover, the second holding plate 46 receive loads with a support, i.e. through the bearing block 62 because, of the outer peripheral surface of the bearing holding portion 52 penetrating the bearing block 62, the outer peripheral surface of the tip portion 521 is in contact with the inner peripheral surface of the bearing block 62.

The bolts 82 penetrate the ribs 621 at the four locations projecting along the second holding plate 46 from the tip of a leg portion 625 forming a cylindrical gap which extends leftward from the right end portion 624 of the bearing block 62 being in contact with the outer peripheral surface of the tip portion 521 of the bearing holding portion 52. As a result, the bearing block 62 is fixed to the second holding plate 46 at four locations. Thickness t1 of a cylindrical wall portion 522 of the bearing holding portion 52 is set large to achieve higher rigidity and is set larger than thickness t2 of the leg portion 625 of the bearing block 62, for example. By setting a large thickness for the bearing holding portion 52, it is possible to rigidly support the right axle portion 322 and the sun-gear shaft 323 of the axle 32 which are supported on the bearing holding portion 52.

In the assembly of the planetary gear device, the bearings 60 and 61 are disposed in bearing fitting holes 461 and 462 formed in the second holding plate 46, respectively. Then, the large-gear portions 56a and 57a are positioned to be partially situated within the bearing holding portion 52 through the cuts 52a formed in the two axially-symmetrical locations on the outer peripheral wall of the bearing holding portion 52. The planetary-gear shafts 58 and 59 are inserted into axial bores in the planetary gears 56 and 57 from the right, and left end portions of the planetary-gear shafts 58 and 59 are fitted into the bearings 60 and 61, respectively. Incidentally, bearing fitting holes are formed in the bearing block 62 similarly to the bearing fitting holes 461 and 462, and the bearings 63 and 64 are disposed into these bearing fitting holes, respectively. Thereafter, the bearing block 62 is positioned such that the right end portions of the planetary-gear shafts 58 and 59 are aligned and fitted in the bearings 63 and 64. Then, the bolts 82 set through the bolt insertion holes 622 provided in the leg portion 621 of the bearing block 62 are screwed into screw holes 463 provided in the second holding plate 46 to fix the bearing block 62 to the holding plate 46. In the state of being fixed to the second holding plate 46 with the bolts 82, the bearing block 62 covers the cylindrical bearing holding portion 52. As a result, the bearing holding portion 52 is situated in the bearing block 62.

Figure 8:
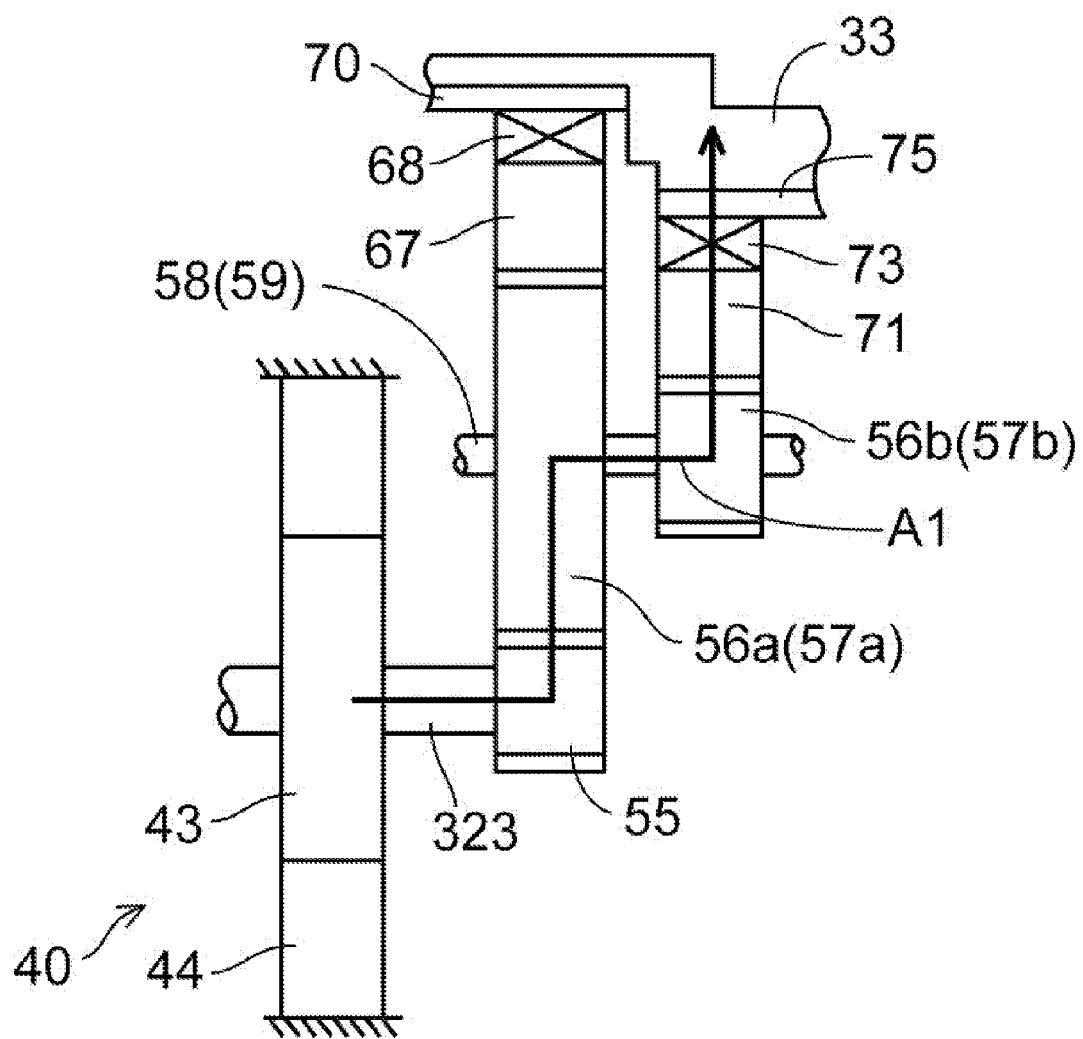
FIG. 8 is a schematic view showing a drive-power transmission path of the reduction gear device.
Figure 9:
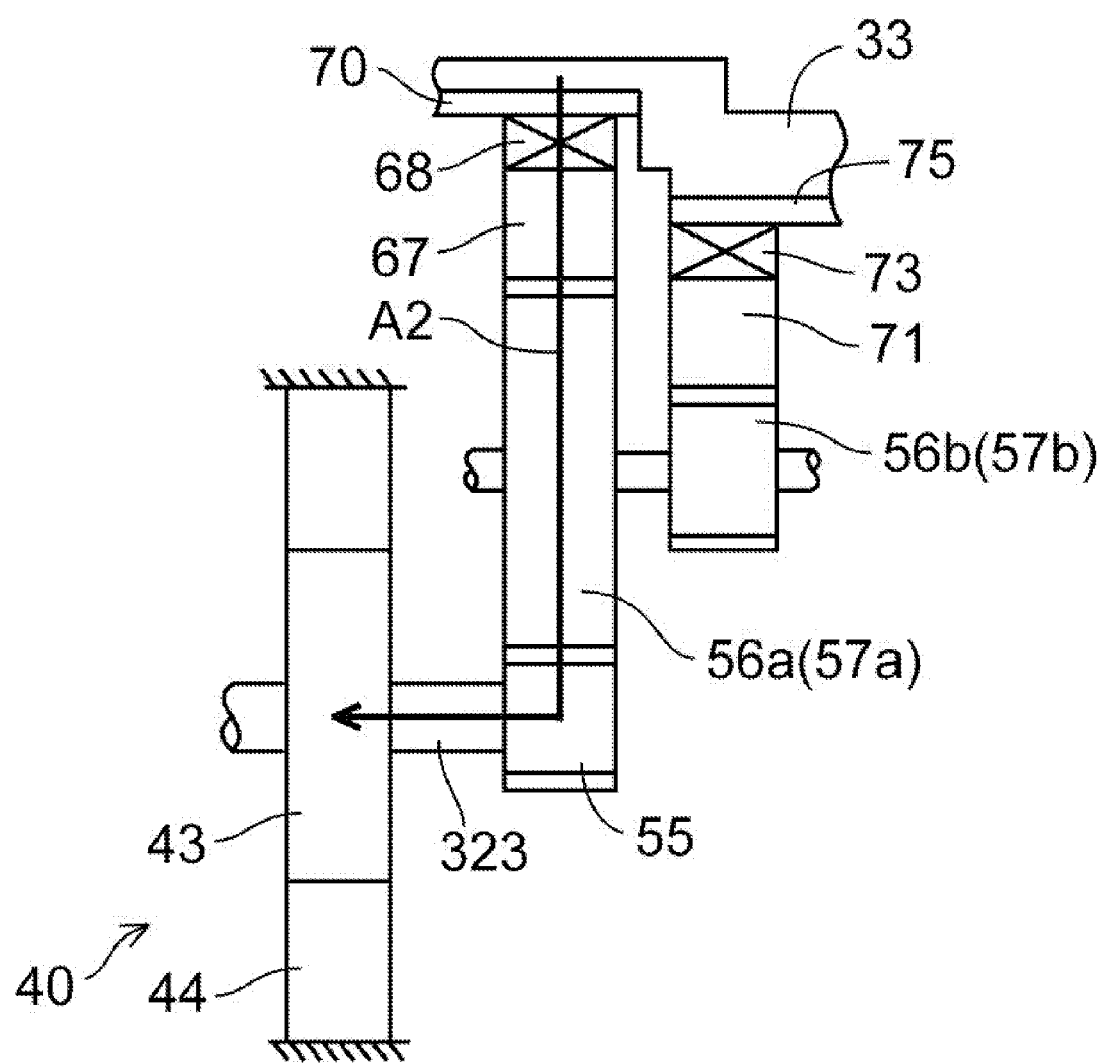
FIG. 9 is a schematic view showing a regenerative-power transmission path of the reduction gear device.

FIGS. 8 and 9 are schematic views respectively showing a drive-power transmission path and a regenerative-power transmission path to transmit power between the electric motor 40 and the hub 33, and the same reference numerals as those in FIGS. 2 and 3 denote the same or similar portions.

First, the drive-power transmission path will be described with reference to FIG. 8. In a case of driving the hub 33 upon supply of electric power to the electric motor 40, applying electricity to the wirings 47 causes actions between magnetic fields generated around the stator 44 and the magnets of the rotor 43 and thereby rotates the rotor 43. The rotation of the rotor 43 is transmitted to the large-gear portions 56a and 57a of the planetary gears 56 and 57 through the sun gear 55 provided on the sun-gear shaft 323. The rotations of the planetary gears 56 and 57 are transmitted to the first internal gear 67 to rotate the first one-way clutch 68 and are also transmitted to the second internal gear 71 through the small-gear portions 56b and 57b of the planetary gears 56 and 57 to rotate the second one-way clutch 73.

The first one-way clutch 68 and the second one-way clutch 73 are disposed such that their engaging directions may be opposite to each other during the drive and the regeneration of the electric motor 40. Here, the clutches' engaging directions are set such that during the drive of the electric motor 40, the first one-way clutch 68 does not transmit the rotation of the first internal gear 67 to the first clutch plate 70, and only the second one-way clutch 73 transmits the rotation of the second internal gear 71 to the second clutch plate 75. Moreover, the clutches' engaging directions are set such that during the regeneration of the electric motor 40, the second one-way clutch 73 does not transmit the rotation of the second internal gear 71 to the second clutch plate 75, and only the first one-way clutch 68 transmits the rotation of the first internal 68 to the first clutch plate 70.

Accordingly, during the drive of the electric motor 40, the rotations of the planetary gears 56 and 57 are transmitted to the second internal gear 71, and the rotation of the second internal gear 71 is transmitted to the second clutch plate 75 through the second one-way clutch 73. As a result, the cover 39 to which the second clutch plate 75 is fixed and the case 38 of the hub 33 which is fastened to the cover 39 is rotated, thereby driving the rear wheel WR. In other words, as illustrated with arrow A1 in FIG. 8, there is formed a power transmission path which transmits the power of the electric motor 40 to the rear wheel WR through the sun gear 55, the small-gear portions 56b and 57b of the planetary gears 56 and 57, the second internal gear 71, the second one-way clutch 73, the second clutch plate 75, and the hub 33 sequentially.

On the other hand, during the regeneration of the electric motor 40, in FIG. 9, the operation is such that of the first one-way clutch 68 and the second one-way clutch 73, the first one-way clutch 68 transmits the rotation. Thus, as the rear wheel WR rotates, that rotation, i.e. the rotation of the hub 33 and of the first clutch plate 70 fixed to the hub 33 is transmitted to the first internal gear 67 through the first one-way clutch 68. During the regeneration, the second one-way clutch 73 does not operate, and thus the second clutch 75 and the second internal gear 71 slip without engaging with each other.

The rotation transmitted to the first internal gear 67 is then transmitted to the sun gear 55 through the large-gear portions 56a and 57a of the planetary gears 56 and 57 and thereby rotates the sun-gear shaft 323. The rotor 43 is rotated together with the sun-gear shaft 323, so that the magnetic fields of the permanent magnets 42 disposed on the outer periphery of the rotor 43 and the windings 47 of the stator 44 act on one another. Accordingly, electric current is induced in the windings 47. In other words, as illustrated with arrow A2 in FIG. 9, there is formed a regenerative-power transmission path in which the rotation of the rear wheel WR is transmitted to the electric motor 40 through the hub 33, the first clutch plate 70, the first one-way clutch 68, the first internal gear 67, the large-gear portions 56a and 57a of the planetary gears 56 and 57, and the sun gear 55 sequentially.

In these power transmission paths, the sun gear 55 and the large-gear portions 56a and 57a of the planetary gears 56 and 57 are involved with both the drive and the regeneration. Thus, the difference in speed reduction ratio between the drive and the regeneration is the difference between a speed reduction ratio determined by the second internal gear 71 and the small-gear portions 56b and 57b of the planetary gears 56 and 57 and a speed reduction ratio determined by the first internal gear 67 and the large-gear portions 56a and 57a of the planetary gears 56 and 57.

According to the instances shown in FIGS. 8 and 9, the power transmission paths during the drive and the regeneration of the electric motor 40 are independent of each other in a broad view, while some of the gears forming the power transmission paths are supported on a common shaft (planetary-gear shaft 58 or 59) so that they can rotate together. Thus, the speed reduction ratio during the drive and that during the regeneration (speed increasing ratio in the case of the regeneration) can differ from each other without increasing the number of gears and support shafts of the gears. Accordingly, in a characteristic concerning the relationship between the number of revolutions and the torque of the electric motor, a region available to the electric motor during the drive is set to a region with high efficiency, and at the same time, the speed increasing ratio can be set such that high efficiency can be achieved also for the characteristic during the regeneration.

Although the foregoing embodiment is an instance where the present invention is applied to an electric vehicle, the present invention is not limited to the electric vehicle 1 and is applicable also to power-assisted bicycles and hybrid vehicles. For example, the power unit including the reduction gear device of the foregoing embodiment can be employed as a drive source in a power-assisted bicycle configured to use the power of an electric motor to assist the pedaling force of the rider pedaling with his or her own bodily movement.

Moreover, the power unit including the reduction gear device of the foregoing embodiment can be applied to an electric motor in a hybrid vehicle using, as its power sources, a combination of the power of an internal combustion engine and that of the electric motor, and can be used as a power source together with the internal combustion engine.

EXPLANATION OF THE REFERENCE NUMERALS

1 ELECTRIC VEHICLE
22 SWINGARM
23 POWER UNIT
32 AXLE
33 WHEEL HUB
40 ELECTRIC MOTOR
41 REDUCTION GEARING
43 ROTOR
44 STATOR
45 FIRST HOLDING PLATE
46 SECOND HOLDING PLATE
52 BEARING HOLDING PORTION
55 SUN GEAR
56, 57 PLANETARY GEAR
62 BEARING BLOCK
68 REGENERATION-SIDE ONE-WAY CLUTCH
70 REGENERATION-SIDE-INTERNAL-GEAR SUPPORTING MEMBER
71 DRIVE-SIDE INTERNAL GEAR (DRIVE-SIDE FINAL-STAGE GEAR)
73 DRIVE-SIDE ONE-WAY CLUTCH
322 RIGHT AXLE PORTION (FIRST SUPPORT SHAFT)
323 SUN-GEAR SHAFT (MOTOR OUTPUT SHAFT)

The invention claimed is:
1. A vehicle drive unit, comprising:
an electric motor provided in a vehicle wheel hub, said electric motor including an output shaft;
an axle including a first support shaft and a second support shaft disposed at ends of the output shaft; and
reduction gearing including a reduction gear coupled to the output shaft,
wherein the electric motor comprises a cylindrical stator held on both sides by a pair of a first holding plate and a second holding plate, and a rotor including the output shaft which rotates relative to the stator about an axis of the axle, the reduction gear of the reduction gearing being supported on the second holding plate and a bearing block joined to the second holding plate,
wherein the second holding plate includes a bearing holding portion provided in such a way as to project toward the second support shaft and to cover an outer periphery of a portion of the output shaft adjacent to the second support shaft,
wherein the first support shaft is supported on the first holding plate, and wherein the second support shaft is supported on the bearing holding portion.

2. The vehicle drive unit according to claim 1, wherein one end of the output shaft of the electric motor is supported on the first holding plate and another end of the output shaft is supported on the bearing holding portion.

3. The vehicle drive unit according to claim 1, wherein the reduction gear comprises a planetary gear meshing with a sun gear provided on the output shaft, and wherein a cut is disposed in an outer peripheral wall forming the bearing holding portion, the cut penetrating the outer peripheral wall so as to enable the planetary gear to be disposed partially within the bearing holding portion and to mesh with the sun gear.

4. The vehicle drive unit according to claim 3, wherein a first thickness of a wall portion of the bearing holding portion in which the cut is formed is larger than a second thickness of the bearing block.

5. The vehicle drive unit according to claim 4, wherein an outer peripheral surface of a tip portion of the bearing holding portion is in contact with an inner peripheral surface of an opening portion of a bearing-holding-portion insertion hole formed in the bearing block.

6. The vehicle drive unit according to claim 3, wherein two planetary gears are provided such that the two planetary gears are symmetrical about the output shaft of the electric motor.

7. The vehicle drive unit according to claim 3, wherein the cut is disposed at two locations corresponding to the two planetary gears at which the cuts are disposed along a front-rear direction of a body of a vehicle to be equipped with a wheel including the wheel hub.

8. The vehicle drive unit according to claim 1, wherein
the bearing holding portion is tubular, and
the second holding plate including the bearing holding portion and the bearing block are molded integrally with each other.

9. A vehicle drive unit, comprising:
drive means provided in a vehicle wheel hub for providing rotational power, said drive means including output means for outputting the rotational power;
axle means disposed at ends of the output means;
reduction means for reducing an output from the output means, said reduction means coupled to the output means,
wherein the drive means comprises stator means being held by first and second holding means for holding the stator means, and rotor means for rotating, said rotor means including the output means thereupon and rotating relative to the stator means about an axis of the axle means, the reduction means including a reduction gear supported on the second holding means and bearing block joined to the second holding means, wherein the second holding means includes bearing holding means projecting toward a second support shaft of the axle means and covering an outer periphery of a portion of the output means adjacent to the second support shaft, wherein a first support shaft of the axle means is supported on the first holding means, and wherein the second support shaft is supported on the bearing holding means.

10. The vehicle drive unit according to claim 9, wherein one end of the output means is supported on the first holding means and another end of the output means is supported on the bearing holding means.

11. The vehicle drive unit according to claim 9, wherein the reduction means comprises a planetary gear meshing with a sun gear disposed on the output means, and wherein cut means is disposed in an outer peripheral wall forming the bearing holding means, the cut means penetrating the outer peripheral wall so as to enable the planetary gear to be disposed partially within the bearing holding means and to mesh with the sun gear.

12. The vehicle drive unit according to claim 11, wherein a first thickness of a wall portion of the bearing holding means in which the cut means is formed is larger than a second thickness of the bearing block.

13. The vehicle drive unit according to claim 12, wherein an outer peripheral surface of a tip portion of the bearing holding means is in contact with an inner peripheral surface of an opening portion of a bearing-holding-portion insertion hole formed in the bearing block.

14. The vehicle drive unit according to claim 11, wherein two planetary gears are provided such that the two planetary gears are symmetrical about the output means.

15. The vehicle drive unit according to claim 11, wherein the cut means is disposed at two locations corresponding to two planetary gears at which the cut means are disposed along a front-rear direction of a body of a vehicle to be equipped with a wheel including the wheel hub.

16. The vehicle drive unit according to claim 9, wherein the bearing holding means comprises a tubular member, and wherein the second holding means, the bearing holding means, and the bearing block are molded integrally with each other.

* * * * *